3,690,977
METHOD FOR MAKING AIR-PERMEABLE WATER-PROOF PRODUCTS HAVING FABRIC-LIKE AESTHETIC PROPERTIES
John T. Loft, Springfield, Steven G. Plovan, Livingston, and Clifford M. Vogt, Madison, N.J., assignors to Celanese Corporation, New York, N.Y.
No Drawing. Filed June 4, 1970; Ser. No. 43,563
Int. Cl. D04h 3/16; B32b 5/24
U.S. Cl. 156—167                     6 Claims

ABSTRACT OF THE DISCLOSURE

Novel products are described which possess a capability of transmitting air and moisture vapor, are waterproof, and have fabric-like aesthetic properties. These products may have applications such as rainwear material, tent material, garment liners, and shoe liners. These products may be made by spray spinning filamentary polymer material onto open-celled polymer film, or into non-cellular elastic polymer film with the additional steps of stretching and heat setting creating a stable open-celled structure in the film portion of the product. Subsequent calendering of the product may further improve its fabric-like aesthetic properties.

BACKGROUND OF THE INVENTION

Field of the invention

This invention relates to air-permeable waterproof products having fabric-like aesthetic properties and to methods for making such products.

Summary of the prior art

Heretofore, films have been prepared from synthetic resins or polymers such as polypropylene by various melt extrusion or casting methods. Such films have many desirable properties such as high strength, and resistance to heat, light, and various chemicals.

Moreover, for applications such as backings for medical dressings or bandages, films have been prepared which have the additional property of excluding liquids such as water while permitting the passage of air. Films possessing this additional property are described for example, in U.S. Patent 3,426,754, which patent is assigned to the assignee of the present invention.

While the above-described air-permeable waterproof films of the prior art are useful, the search has continued for new products which in addition to being air-permeable and waterproof also have fabric-like aesthetic properties such as a good feel or hand. The latter is important from an aesthertic appeal standpoint for applications such as rainwear and shoe liners.

SUMMARY OF THE INVENTION

Accordingly, an object of the present invention is to provide novel air-permeable waterproof products which have fabric-like aesthetic properties.

Another object of the present invention is to provide novel methods for producing such air-permeable waterproof products.

Other and further objects of the present invention will be apparent to those skilled in the art from the following:

In accordance with the present invention, air-permeable waterproof products, i.e., products having the property of excluding liquids such as water while permitting the passage therethrough of gases or vapors such as air and moisture vapor, are provided which have fabric-like aesthetic properties and which comprise an open-celled microporous polymer film having substantially continuous randomly arranged filamentary polymer material bonded thereto.

These unique products may be made by spray spinning filamentary material directly onto an open-celled microporous polymre film such that thermal self-bonding occurs between the filamentary material and the film, or by spray spinning the filamentary material in the same manner onto an elastic film, stretching the resulting product until an open-celled structure is produced in the film portion of the product and thereafter heating or heat setting the resulting product at substantially constant length to impart dimentional stability thereto.

If desired, the resulting final product may be treated by calendering, preferably at a temperature such that no additional thermal self-bonding occurs, so as to further improve its fabric-like aesthetic properties.

Surprisingly, it has been found that these air-permeable waterproof products having fabric-like aesthetic properties may be produced with a level of air-permeability substantially the same as that of an ordinary untreated open-celled film not having these fabric-like aesthetic properties. That is, the spray spun filamentary material has been found to thermally self-bond to the film such that a strong useful fabric-like product may be produced without any substantial sacrifice of air-permeability.

Other aspects and advantages of the present invention will become apparent to one skilled in the art to which the present invention pertains from the following description of the preferred embodiments:

DESCRIPTION OF THE PREFERRED EMBODIMENTS

As summarized above, the air-permeable waterproof products of the present invention have fabric-like aesthetic properties and comprise an open-celled microporous polymer film having spray spun substantially continuous randomly arranged filamentary polymer material bonded thereto.

As stated, the products of the present invention may be formed by spray spinning onto non-porous elastic film with subsequent steps of stretching and heat setting forming an open-celled microporous structure in the film portion of the product, or by spray spinning directly onto open-celled microporous polymer film which has already been formed by stretching and heat setting the elastic film.

The non-porous elastic films may have an elastic recovery at zero recovery time (hereinafter defined) when subjected to a standard strain (extension) of 50 percent at 25° C. and 65 percent relative humidity of at least about 40 percent, preferably at least about 50 percent, and most preferably at least about 80 percent.

Elastic recovery as used herein is a measure of the ability of a structure or shaped article such as a film to return to its original size after being stretched, and may be calculated as follows:

Elastic Recovery (ER), Percent $$= \frac{\text{(length when stretched)} - \text{(length after stretching)}}{\text{length added when stretched}} \times 100$$

Stated another way, elastic recovery provides a measure of conformance with the Hooke's law portion of a stress-strain curve.

Although a standard strain of 50 percent is used herein to identify elastic properties of films, such a strain is merely exemplary. In general, such films will have elastic recoveries higher at strains less than 50 percent, and somewhat lower at strains substantially higher than 50 percent, as compared to their elastic recovery at a 50 percent strain.

These elastic films will also have a percent crystallinity of at least 20 percent, preferably at least 30 percent, and most preferably at least 50 percent, e.g., about 50 to 90 percent, or more. Percent crystallinity is determined by the X-ray method described by R. G. Quynn et al. in the Journal of Applied Polymer Science, vol. 2, No. 5, pp. 166–173 (1959). For a detailed discussion of crystallinity and its significance in polymers, see Polymers and Resins, Golding (D. Van Nostrand, 1959).

Preferred suitable starting elastic films, as well as the preparation thereof, are further defined in copending application Ser. No. 572,601, now abandoned, filed Aug. 15, 1966, Wissbrun and Bierenbaum, inventors, and assigned to the same assignee as the present invention.

Other elastic films which may be suitable for the practice of the present invention are described in British Pat. 1,052,550 published Dec. 21, 1966.

The starting elastic film which may be utilized in the preparation of the air permeable waterproof products of the present invention should be differentiated from films formed from classical elastomers such as the natural and synthetic rubbers. With such classical elastomers the stress-strain behavior, and particularly the stress-temperature relationship, is governed by entropy-mechanism of deformation (rubber elasticity). The positive temperature coefficient of the retractive force, i.e., decreasing stress with decreasing temperature and complete loss of elastic properties at the glass transition temperatures, are particularly consequences of entropy-elasticity. The elasticity of the starting elastic films utilized herein, on the other hand, is of a different nature. In qualitative thermodynamic experiments with these elastic starting films, increasing stress with decreasing temperature (negative temperature coefficient) may be interpreted to mean that the elasticity of these materials is not governed by entropy effects but dependent upon an energy term. More significantly, the starting elastic films have been found to retain their stretch properties at temperatures where normal entropy-elasticity could no longer be operative. Thus, the stretch mechanism of the starting elastic films is thought to be based on energy-elasticity relationships, and these elastic films may then be referred to as "non-classical" elastomers.

As stated, the starting elastic films which may be employed in this invention are made from a polymer of a type capable of developing a significant degree of crystallinity, as contrasted with more conventional or "classical" elastic materials such as the natural and synthetic rubbers which are substantially amorphous in their unstretched or tensionless state.

A significant group of polymers, i.e., synthetic resinous materials, from which the elastic and open-celled films may be formed are the olefin polymers, e.g., polyethylene, polypropylene, poly-3-methyl butene-1, poly-4-methyl pentene-1, as well as copolymers of propylene, 3-methyl butene-1, 4-methyl pentene-1, or ethylene with each other or with minor amounts of other olefins, e.g., copolymers of propylene and ethylene, copolymers of a major amount of 3-methyl butene-1 and a minor amount of a straight chain n-alkene such as n-octene-1, n-hexadecene-1, n-octadecene-1, or other relatively long chain alkenes, as well as copolymers of 3-methyl pentene-1 and any of the same n-alkenes mentioned previously in connection with 3-methyl butene-1. These polymers in the form of films should generally have a percent crystallinity of at least 20 percent, preferably at least 30 percent, and most preferably about 50 percent to 90 percent, or higher.

For example, a film-forming homopolymer of polypropylene may be employed. When propylene homopolymers are contemplated, it is preferred to employ an isotactic polypropylene having a percent crystallinity as indicated above, a weight average molecular weight ranging from about 100,000 to 750,000, preferably about 200,000 to 500,000, and a melt index (ASTM–1958D–1238–57T, part 9, page 38) from about 0.1 to about 75, preferably about 0.5 to 30, so as to give a final film product having the requisite physical properties.

While the present disclosure and examples are directed primarily to the aforesaid olefin polymers, the invention also contemplates the high molecular weight acetal, e.g., oxymethylene, polymers. While both acetal homopolymers and copolymers are contemplated, the preferred acetal polymer is a "random" oxymethylene copolymer, i.e., one which contains recurring oxymethylene, i.e., —$CH_2$—O—, units interspersed with —OR— groups in the main polymer chain where R is a divalent radical containing at least two carbon atoms directly linked to each other and positioned in the chain between the two valences, with any substituents on said R radical being inert, that is, those which do not include interfering functional groups and which will not induce undesirable reactions, and wherein a major amount of the —OR— units exist as single units attached to oxymethylene groups on each side. Examples of preferred polymers include copolymers of trioxane and cyclic ethers containing at least two adjacent carbon atoms such as the copolymers disclosed in United States Pat. 3,027,352 of Walling et al. These polymers in film form may also have a crystallinity of at least 20 percent, preferably at least 30 percent, and most preferably at least 50 percent, e.g., 50 to 60 percent, or higher. Further, these polymers have a melting point of at least 150° C., and a number average molecular weight of at least 10,000. For a more detailed discussion of acetal and oxymethylene polymers, see, Formaldehyde, Walker, pp. 175–191 (Reinhold, 1964).

Other relatively crystalline polymers to which the invention may be applied are the polyalkylene sulfides such as polymethylene sulfide and polyethylene sulfide, the polyarylene oxides such as polyphenylene oxide, the polyamides such as polyhexamethylene adipamide (nylon 66) and polycaprolactam (nylon 6), and polyesters such as polyethylene terephthalate, all of which are well known in the art and need not be described further herein for sake of brevity.

The types of apparatus suitable for forming the starting elastic films which may be used in this invention are well known in the art.

For example, a conventional film extruder equipped with a shallow channel metering screw and coat hanger die, is satisfactory. Generally, the resin is introduced into a hopper of the extruder which contains a screw and a jacket fitted with heating elements. The resin is melted and transferred by the screw to the die from which it is extruded through a slot in the form of a film from which it is oriented or drawn by a take-up or casting roll. More than one take-up roll in various combinations or stages may be used. The die opening or slot width may be in the range, for example, of about 10 to 200 mils.

Using this type of apparatus, film may be extruded at a drawdown ratio of about 20:1 to 200:1, preferably 50:1 to 150:1.

The terms "drawdown ratio" or, more simply, "draw ratio," as used herein is the ratio of the film wind-up or take-up speed to the speed of the film issuing at the extrusion die.

The melt temperature for film extrusion is, in general, no higher than about 100° C. above the melting point of the polymer and no lower than about 10° C. above the melting point of the polymer.

For example, polypropylene may be extruded at a melt temperature of about 180° C. to 270° C., preferably 200° C. to 240° C. Polyethylene may be extruded at a melt temperature of about 175° C. to 225° C. while acetal polymers, e.g., those of the type disclosed in U.S. Patent 3,027,352, may be extruded at a melt temperature of about 175° C. to 235° C., preferably 185° C. to 215° C.

The extrusion operation is preferably carried out with rapid cooling and rapid drawdown in order to obtain maximum elasticity. This may be accomplished by having the take-up roll relatively close to the extrusion slot, e.g., within two inches and, preferably, within one inch. An "air knife" operating at temperatures between, for example 0° C. to 40° C., may be employed within one inch of the slot to quench, i.e., quickly cool and solidify, the film. The take-up roll may be rotated, for example, at a speed of 10 to 1000 ft./min., preferably 50 to 500 ft./ min.

While the above description has been directed to slit die extrusion methods, an alternative method of forming the starting elastic films contemplated by this invention is the blown film extrusion method wherein a hopper and an extruder are employed which are substantially the same as in the slot extruder described above. From the extruder, the melt enters a die from which it is extruded through a circular slot to form a tubular film having an initial diameter $D_1$. Air enters the system through an inlet into the interior of said tubular film and has the effect of blowing up the diameter of the tubular film to a diameter $D_2$. Means such as air rings may also be provided for directing the air about the exterior of extruded tubular film so as to provide quick and effective cooling. Means such as a cooling mandrel may be used to cool the interior of the tubular film. After a short distance during which the film is allowed to completely cool and harden, it is wound up on a take-up roll.

Using the blown film method, the drawdown ratio is preferably 20:1 to 200:1, the slot opening 10 to 200 mils, the $D_2/D_1$ ratio, for example, 0.5 to 6.0 and preferably about 0.9 to about 2.5, and the take-up speed, for example, 30 to 700 ft./min. The melt temperature may be within the ranges given previously for straight slot extrusion.

The extruded film may then be initially heat treated or annealed in order to improve crystal structure, e.g., by increasing the size of the crystallites and removing imperfections therein. Generally, this anneaing is carried out at a temperature in the range of about 5° C. to 100° C. below the melting point of the polymer for a period of a few seconds to several hours, e.g., 5 seconds to 24 hours, and preferably from about 30 seconds to 2 hours. For polypropylene, the preferred annealing temperature is about 100 to 155° C., while for oxymethylene (acetal) copolymers, the preferred annealing temperature is about 110 to 165° C.

An exemplary method of carrying out the annealing is by placing the extruded film in a tensioned or tensionless state in an oven at the desired temperature in which case the residence time is preferably in the range of about 30 seconds to 1 hour.

As stated, the products of the present invention may be formed by spray spinning onto non-porous elastic film with subsequent steps of stretching and heat setting forming an open-celled microporous structure in the film portion of the product, or by spray spinning directly onto open-celled microporous polymer film which has already been formed by stretching and heat setting the elastic film.

Preferably, the elastic film or film product is cold stretched, and most preferably is first cold stretched and then hot stretched in a two step or stage stretching operation, until the open-celled structure is formed.

The two step cold stretch-hot stretching operation advantageously results in an open-celled structure having improved porosity and thermal stability, and is preferably carried out through the use of techniques and apparatus disclosed in pending United States patent application S.N. 876,511, filed Nov. 13, 1969, of S. G. Plovan, J. T. Loft, and M. L. Druin now abandoned for continuation-in-part application S.N. 84,712, filed Oct. 28, 1970. Application S.N. 876,511 is owned by the assignee of the present invention and the disclosure thereof is incorporated herein by reference.

The term "cold stretching" as used herein is defined as stretching or drawing a film, or film portion or product, to greater than its original length and at a stretching temperature, i.e., the temperature of the film being stretched, less than the temperature at which melting begins when the film is uniformly heated from a temperature of 25° C. and at a rate of 20° C. per minute. The term "hot stretching" as used herein is defined as stretching above the temperature at which melting begins when the film is uniformly heated from a temperature of 25° C. and at a rate of 20° C. per minute, but below the normal melting point of the polymer, i.e., below the temperature at which fusion occurs. As is known to those skilled in the art, the temperature at which melting begins and the fusion temperature may be determined by a standard differential thermal analyzer (DTA), or by other known apparatus which can detect thermal transitions of a polymer.

The temperature at which melting begins varies with the type of polymer, the molecular weight distribution of the polymer, and the crystalline morphology of the film. For example, polypropylene elastic film may be cold stretched at a temperature below about 120° C., preferably between about 10° C. and 70° C., and conveniently at ambient temperature, e.g., 25° C.

In the two step stretching operation, the polypropylene elastic film may first be cold stretched at the above indicated temperature and then be hot stretched at a temperature above about 120° C. and below the fusion temperature, and preferably between about 130° C. and about 150° C. Again, the temperature of the film itself being stretched is referred to herein as the stretch temperature. The stretching in these two steps or stages must be consecutive, in the same direction, and in that order, i.e., cold then hot, but may be done in a continuous, semi-continuous, or batch process, as long as the cold stretched film is not allowed to shrink to any significant degree, e.g., less than 5 percent of its cold stretched length, before being hot stretched. The ratio of the amount of hot stretching to the sum total amount of stretching or drawing may be from above about 0.10:1 to below about 0.99:1, preferably from about 0.50:1 to 0.97:1, and most preferably from about 0.60:1 to 0.95:1. This relationship between the "cold" and "hot" stretching is referred to herein as the "extension ratio" (percent "hot" extension to percent "total" extension.)

The sum total amount of stretching in the above one or two step stretching operations may be in the range of about 10 to 300 percent and preferably about 50 to 150 percent, based on the initial length of the elastic film.

The stretching per se may be performed in any convenient manner using known techniques where a film is positively forwarded by one moving means to a second moving means operating at a higher speed. The temperature of the film per se being stretched is referred to herein as the stretch or draw temperature.

In any stretching operations where heat must be supplied, the film may be heated by heat supplied by the moving rolls which may in turn be heated by an electrical resistance method, by passage over a heated plate, through a heated liquid such as water, a heated gas such as air, or the like.

After the above-described stretching operations, the resulting stretched film product is heat set. Heating the stretched film in a tensioned state at a temperature below the melting point of the polymer has a remarkable influence on the dimensional stability of the open-celled, low density characteristics of the same. This heat treatment may be carried out at a temperature in the range from about 125° C. up to less than fusion temperature, and preferably about 130 to 150° C., for polypropylene; from about 80° C. up to less than fusion temperature, and preferably about 140 to 160° C., for acetal polymers; from about 75° C. up to less than fusion temperature, and preferably about 115 to 130° C., for polyethylene, and at similar temperature ranges for other of the above mentioned polymers. This heat treatment should be carried out while the resulting stretched film product is being held under tension, i.e., such that the film is not free to shrink or can shrink to only a controlled extent not greater than about 15 percent of its stretched length, but not so great a tension as to stretch the film more than an additional 15 percent. Preferably, the tension is such that substantially no shrinkage or stretching occurs, e.g., less than 5 percent change in stretched length.

The period of heat treatment which is preferably carried out sequentially with and after the drawing operation, should be longer than about 0.1 seconds at the higher annealing temperature and, in general, may be within the range of about 5 seconds to 1 hour and preferably about 1 to 30 minutes.

The above described heat setting steps may take place in air, or in other atmospheres such as nitrogen, helium or argon.

The resulting open-celled microporous films or film products, in a tensionless state, have a bulk density lower than the density of the polymeric starting elastic material from which they are formed, which is usually no greater than 95 percent and preferably about 50 to 75 percent of the density of the elastic starting material.

The final crystallinity of the open-celled microporous film is preferably at least 30 percent, more preferably at least 40 percent, and more suitably about 50 to 100 percent, as determined by the aforementioned X-ray method.

The open-celled microporous films may also have an average pore size of 100 to 5000 angstroms, and more usually 150 to 3000 angstroms, the values being determined by mercury porosimetry, as described in an article by R. G. Quynn, at pages 21–34 of Textile Research Journal, January 1963. As used herein, the term "open-celled structure" signifies that the major portion of the cell or pore space of the structure within the geometric confines of the film is accessible to the outside planar surfaces of the film.

Generally, polypropylene open-celled microporous film has, at 25° C. and 65 percent relative humidity, an elastic recovery from a 50 percent extension of 60 to 85 percent, a tensile strength of 20,000 to 30,000 p.s.i., a breaking elongation of 50 to 150 percent, a modulus of 100,000 to 300,000 p.s.i. (all the foregoing in the machine direction), and a haze of 30 percent to opaque, depending on film thickness.

The values of "recovery" or "elastic recovery" hereinbefore referred to are elastic values determined as follows at 25° C. and 65 percent relative humidity:

A sample 15 millimeters in width was placed in an Instron tensile property testing machine with the jaw separation being 2 inches apart. The sample was extended at a rate of 2 inches per minute until a 50 percent extension was reached. The sample was held at that extension for 1 minute and then relaxed at the same rate as extended. A reading was recorded as soon as a no load condition was indicated by the testing machine. The elastic recovery is then calculated as follows:

$$\text{Elastic Recovery} = \frac{\left(\begin{array}{c}\text{Total Length}\\ \text{When Extended}\end{array}\right) - \left(\begin{array}{c}\text{Final Distance}\\ \text{Between Jaws}\end{array}\right)}{\text{Length Added When Extended}} \times 100\%$$

The other properties mentioned were determined with a standard ASTM method as follows:

Tensile Strength: ASTM # D882—Method A (Sample width 15 mm.)
Breaking Elongation: ASTM # D882—Method A (Sample width 15 mm.)
Modulus: ASTM # D882—Method A (Sample width 1 inch)
Haze: ASTM # D1003—Procedure A as per FIG. 2 therein.

Further, polypropylene open-celled microporous film exhibits water vapor transmittance as high as 1600, generally 500 to 1400, the units of transmittance being given in grams/24 hours–m.$^2$–atm., the method of determining transmittance being ASTM 96–63T (Procedure B).

The spray spinning operation preferably is carried out through the use of techniques and apparatus disclosed in pending patent application Ser. No. 740,913 of Wagner et al. entitled "Method and Apparatus for Producing Fibrous Structures" filed in the United States Patent Office on June 28, 1968. Such application is owned by the assignee of this application and the disclosure thereof is incorporated herein by reference.

In general, any of the polymers which are melt spinnable may be used in the spray spinning operation to form the filamentary material portion of the air-permeable waterproof products of the present invention. Of the various high molecular weight fiber forming crystalline polymers that can be melted and extruded through an orifice as a filament, the polyolefins, particularly polypropylene having the molecular weight, melt index, and crystallinity characteristics described above are preferred. Polyethylene is also suitable. Cellulose acetate is sometimes particularly advantageous and is within the scope of this invention. Other polymers which may be used with correspondingly good results are the polyamides, polyacetals, polyalkylene sulfides, polyarylene oxides, and polyesters. Suitable blends and copolymers of the above are also within the scope of the invention.

Preferred spray spinning nozzle structures are disclosed in the aforesaid patent application of Wagner et al., and for detailed information on these structures reference should be made to such application. It will be sufficient to point out here that the preferred spray spinning nozzle is provided with an orifice through which the fiber-forming material is extruded and is also provided with a plurality of gas passages disposed about the extrusion orifice. The gas passages are inclined to direct gas, such as steam, along generally converging paths the axes of which do not intersect the projected axis of the extrusion orifice. As a filament emerges from the extrusion orifice, the high velocity gas streams issuing from the gas passages attenuate the filament and project it away from the nozzle in a random swirling pattern.

Although the fiber is like conventionally spun fiber in the sense that it is in the form of a substantially continuous filament, it is characterized by random, relatively gradual lengthwise variations in diameter and varying degrees of crystalline orientation which result from random variations in the attenuating action of the gas streams contacting the freshly spun filament. For example, the cross section of the largest filament portion can be more than ten times that of the smallest filament portion, with the mean being about two and one-half times the cross section of the smallest filament portion. Additionally, surface effects have been observed in examining the filament by electron microscopy techniques. The surfaces of the spray spun filaments examined were somewhat rough as compared with conventionally spun filaments. This surface roughness can be beneficial for tactile appeal or "feel," and for wettability.

The non-porous elastic film or the open-celled microporous film is disposed at an angle in front of one or more of the spray spinning nozzles to receive the freshly-spun filamentary material in a random arrangement. As the film is moved to bring its surface across the path of the swirling filamentary material, there is formed on the film a fibrous body or web portion in which the substantially continuous filamentary material makes many traverses in all directions. Preferably substantially all of the filamentary material is disposed generally parallel to the plane of the film.

The spray spinning process as part of the invention is a flexible one from the standpoints of apparatus requirements and control over product qualities.

For example, the cross sectional shape of the extrusion orifice of the nozzle means is determined by the filament shape desired. The usual round or oval filaments are preferred, but other shapes can be employed. For example, trilobal filaments may be produced by extruding the material through Y-shaped orifices.

If desired, the film may be moved through and between two or more spray spinning orifices such that the filamentary material is received on at least a portion of each side of the film.

In the present invention, the film is positioned to receive the filamentary material prior to complete hardening thereof. When the filamentary material is collected while portions of its surface are somewhat tacky, substantial thermal self-bonding occurs at randomly located crossover points between contacting filament segments, and at randomly located contact points between the film and filamentary material. In this manner, filament sections of varying lengths are formed in the filamentary material portion of the resulting product. The larger diameter filament portions cool at a shower rate than the smaller diameter filament portions and therefore act as tacky hot melt bonding sites. The random distribution of these sites, in addition to some filament entanglement, gives the web portion of the resulting product sufficient coherency to give fabric-like properties in accordance with the invention.

After spray spinning the filamentary material onto the open-celled film, the resulting product may be further treated such as by calendering as described below.

After spray spinning the filamentary material onto the non-porous elastic film, however, the resulting product must be stretch and heat set as described above in order to form the open-celled microporous structure in the film portion of the product.

When the non-porous elastic film having the filamentary material bonded thereto as a whole is stretched, the individual filament sections between bonding sites will be acted upon in diverse ways, and different filament sections may be stretched to different degrees, thus increasing their crystalline orientation by different amounts.

This effect can best be appreciated when it is recalled that the as-collected filamentary material is characterized by a random orientation of substantially continuous filamentary material, by some filament entanglement and by a random dispersion of thermal bonding sites. Hence, stretching of the overall spray spun body imposes various tensile loads upon the different filament segments. Some of these entangled or bonded filament segments may slip, pull apart, or rupture, thereby creating filament segments with new effective lengths. Some filament segments may not be subjected to any tensile load and others may be stretched a great deal.

Even before the elongation, the substantially continuous filamentary material has been subjected to varying attenuating forces by the gas jets of the spray nozzle, which results in varying crystalline orientation along the filament. This random stretching of the filament sections upon elongation of the spray spun body, therefore, results in an even greater degree of varying crystalline orientation of the filament sections in the final product. This increase in crystalline orientation has been found to be particularly desirable from the standpoint of achieving a suitable balance between the fabric-like properties of the resulting product and the break resistance of the individual filament sections.

Another result of the stretching operation described above is a change in the arrangement of the filamentary material with respect to itself and to the film. That is, the stretching operation serves to reorient the filamentary material so as to produce a general alignment of filament sections in the stretch direction. In addition, more of these filament sections will extend generally parallel to the plane of the filament portion of the product, thus giving a smoother, more uniform product.

It will be understood also that a plurality of spray nozzles may be positioned to project filamentary material onto a film surface in overlapping patterns, and/or back and forth relative movements in a lateral direction may be effected as between the spray nozzle means and the film so that the spray pattern traverses back and forth across the width of the film.

Control over the amount of filamentary material deposited on the film can be achieved by adjusting the extrusion rate at the nozzle or by adjusting the rate of movement of the film across the spray path. The amount of filamentary material deposited can be varied according to the desired end use, and amounts of from about 0.1 to about 50 oz. per yard can be obtained.

In some instances it may be found desirable to combine solid or liquid additives with the filamentary material portion of the air-permeable waterproof products of the present invention. One may, for example, wish to add one or more compositions for fire proofing purposes. Binders or plasticizers may be employed also in instances where these contribute desired properties, but care should be taken not to substantially impair the air-permeability of the resulting product.

The resulting air-permeable waterproof products of the present invention may be further treated if desired. For example, these products may be calendered, i.e., pressed between moving rolls or rollers in a conventional calendering machine, to improve further its fabric-like aesthetic properties, e.g., the "hand" of the product.

Advantageously, the calendering is conducted at temperatures such that no additional thermal self-bonding of the filamentary material occurs. For example, the calendering may be conducted at temperatures from about 10° C. to 100° C., preferably from about 20° C. to 50° C., and most preferably about 25° C.

The following examples serve to illustrate further the present invention; all parts and percentages in the examples and throughout the specification and claims are by weight unless otherwise specified.

Example I.—Crystalline polypropylene having a melt index of 0.7 and a density of 0.92 is melt extruded at 230° C. through an 8 inch slit die of the coat hanger type using a 1 inch extruder with a shallow metering screw. The length to diameter ratio of the extruded barrel is 24/1. The extrudate is drawndown very rapidly to a melt drawdown ratio of 150, and contacted with a rotating casting roll maintained at 50° C. and 0.75 inch from the lip of the die. The film produced in this fashion is found to have the following properties: thickness, 0.001 inch, recovery from 50 percent elongation at 25° C., 50.3 percent, crystallinity, 59.6 percent.

A sample of this film is oven annealed in air with a slight tension at 140° C. for about 30 minutes, removed from the oven and allowed to cool. It is then found to have the following properties: recovery from a 50 percent elongation at 25° C., 90.5 percent; crystallinity 68.8 percent.

The annealed elastic film is then stretched and thereafter heat set under tension, i.e., at constant length, at 145° C. for 10 minutes in air. The stretching is conducted at 25° C., and the total stretch is 100 percent, based on the original length of the elastic film. Nitrogen flux (at 65° C.) of the resulting open-celled microporous film is determined to be 24.0 gram moles per cm.$^2$-min.

Nitrogen flux gives an indication of air permeability, with higher nitrogen flux values indicating higher levels of air permeability.

The values of nitrogen flux referred to are calculated as follows:

A film having a standard surface area of 6.5 cm.$^2$ is mounted in a standard membrane cell having a standard volume of 63 cm.$^3$, and the cell is pressurized to a standard differential pressure (the pressure drop across the film) of 200 p.s.i. with nitrogen. The supply of nitrogen is then closed off and the time required for the pressure to drop to a final differential pressure of 150 p.s.i. as the nitrogen permeates through the film is measured with a stop watch. The nitrogen flux, Q, in g.-mol/cm.$^2$-min., is then determined from the equation $$Q = \frac{6.7 \times 10^1}{\Delta t \times T}$$

$\Delta t$ = elapsed time (in seconds)
$T$ = temperature of nitrogen (in ° K.)

which is derived from the gas law, $PV = ZnRT$.

Polypropylene (Hercules Company Profax Type 6423F) is spray spun at a melt temperature of 350° C. through a .016 inch diameter nozzle, using jets of steam superheated to 405° C. and at 21 p.s.i. to attenuate the melt stream of polymer into a continuous filamentary material. The filamentary material is collected on the open-celled microporous film and a thermally self-bonded product about 20 to 22 mils thick is produced. This air-permeable waterproof product has a nitrogen flux essentially equivalent to the pre-spray spun open-celled film. The bond between the filamentary material and the film withstands substantial pulling forces.

Example II.—The air-permeable waterproof product of Example I is calendered at about 25° C. on a conventional calendering machine to a thickness of about 10 to 12 mils. The calendered product has a significantly improved "hand" or "feel."

Example III.—Example I is repeated except that the annealed elastic film is first cold stretched at 25° C. and thereafter hot stretched at 145° C. Total stretch is 100 percent, based on the original length of the film, and the extension ratio of 0.90:1. Nitrogen flux (at 65° C.) of the resulting open-celled microporous film is 127.5 gram mols per cm.$^2$-min., and nitrogen flux of the final product having the spray spun filamentary material bonded thereto is about the same.

Example IV.—Example I is repeated except that the filamentary material is spray spun onto the annealed elastic film. The resulting product is then stretched and heat set at the conditions set forth in Example I to yield an air-permeable waterproof product having fabric-like aesthetic properties. The filament sections in the filamentary portion of the product are substantially parallel to each other and to the plane of the film, thus giving a relatively smooth, uniform product.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the present invention.

We claim:

1. A method for preparing an air-permeable waterproof product having fabric-like aesthetic properties, which method comprises
   (a) spray spinning substantially continuous filamentary material,
   (b) continuously moving an elastic film at an angle across the spray path of the freshly spun filamentary material to collect randomly arranged filamentary material which thermally bonds to itself at randomly located filament crossover points and which thermally bonds to the film at randomly located contact points between the filamentary material and the film,
   (c) stretching the film having the filamentary material bonded thereto until open cells having a pore size of less than 5000 angstroms as porosimetrically determined by mercury penetration are formed in the film, and
   (d) thereafter heat setting the resulting product at substantially constant length to impart dimensional stability thereto.

2. The method of claim 1 wherein the elastic film has a crystallinity of above about 20 percent, and an elastic recovery from a 50 percent strain of at least 40 percent at 25° C., and is subjected to a total stretch of 10 to 300 percent of its original length.

3. The method of claim 2 wherein the film is a polypropylene film and wherein the heat setting is conducted at a temperature between about 130° C. and 150° C.

4. The method of claim 2 wherein the film is an oxymethylene polymer film and wherein the heat setting is conducted at a temperature between about 140° C. and 160° C.

5. A method for preparing an air-permeable waterproof product having fabric-like aesthetic properties, which method comprises:
   (a) melt extruding isotactic polypropylene at a temperature between 200° C. and 240° C. into film form, the polypropylene having a molecular weight of from 200,000 to 500,000 and a melt index of from 0.5 to 30;
   (b) taking up the extruded film at a drawdown ratio between 50:1 and 150:1 to orient the film;
   (c) spray spinning substantially continuous filamentary polypropylene material;
   (d) continuously moving the as-extruded drawdown film at an angle across the spray path of the freshly spun filamentary material to collect the filamentary material therein in a random arrangement, which filamentary material thermally bonds to itself at randomly located filament crossover points and which thermally bonds to the film at randomly located contact points between the filamentary material and the film to form filament sections of varying lengths;
   (e) stretching the film having the filamentary material bonded thereto to a total stretch of 10 to 300 percent of its original length whereby open cells having a pore size of less than 5000 angstroms as porosimetrically determined by mercury penetration are formed in the film and the arrangement of the filamentary material bonded to the film is altered to dispose the filament sections generally parallel to the direction of the stretching and generally parallel to the plane of the film;
   (f) prior to stretching but after taking up the extruded film, heating the film at a temperature between 100° C. and 155° C. for about 5 seconds to 24 hours to improve the crystal structure of the film;
   (g) heat setting the resulting stretched product at substantially constant length and at a temperature between 130° C. and 150° C. to impart dimensional stability thereto; and
   (h) thereafter calendering the resulting heat set product to improve its fabric-like aesthetic properties.

6. The method of claim 5 wherein the filamentary material is spray spun on at least a portion of each side of the film and wherein the calendering is conducted at a temperature below which thermal self-bonding of the filamentary material to itself and to the film occurs.

References Cited

UNITED STATES PATENTS

| | | | |
|---|---|---|---|
| 3,558,764 | 1/1971 | Isaacson et al. | 264—210 |
| 3,543,332 | 12/1970 | Wagner et al. | 264—210 X |
| 3,554,852 | 1/1971 | Sugarman et al. | 161—150 X |
| 3,348,991 | 10/1967 | Abell et al. | 156—306 X |
| 3,509,009 | 4/1970 | Hartmann | 156—181 X |
| 3,536,572 | 10/1970 | Murphy et al. | 161—159 |
| 3,531,367 | 9/1970 | Karsten | 161—161 |
| 3,462,326 | 8/1969 | Steel et al. | 156—72 |
| 3,546,004 | 12/1970 | Schachowsky | 117—104 R |

ROBERT F. BURNETT, Primary Examiner

D. J. FRITSCH, Assistant Examiner

U.S. Cl. X.R.

156—176, 177, 229, 244, 306; 161—150, 157, 160, 161, 402; 264—171, 210